United States Patent
Suehiro et al.

(10) Patent No.: US 12,507,273 B2
(45) Date of Patent: Dec. 23, 2025

(54) COMMUNICATION CONTROL METHOD AND COMMUNICATION SYSTEM

(71) Applicant: TOYOTA JIDOSHA KABUSHIKI KAISHA, Toyota (JP)

(72) Inventors: Yuki Suehiro, Susono (JP); Takahiro Ito, Tama (JP); Naoya Kaneko, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 318 days.

(21) Appl. No.: 18/361,412

(22) Filed: Jul. 28, 2023

(65) Prior Publication Data

US 2024/0040605 A1    Feb. 1, 2024

(30) Foreign Application Priority Data

Aug. 1, 2022    (JP) ................. 2022-122739

(51) Int. Cl.
*H04W 72/542*    (2023.01)
*H04W 72/0453*    (2023.01)
*H04W 72/563*    (2023.01)

(52) U.S. Cl.
CPC ..... *H04W 72/542* (2023.01); *H04W 72/0453* (2013.01); *H04W 72/563* (2023.01)

(58) Field of Classification Search
None
See application file for complete search history.

(56) References Cited

U.S. PATENT DOCUMENTS

| | | | |
|---|---|---|---|
| 2009/0310558 A1 | 12/2009 | Koyanagi | |
| 2013/0035115 A1* | 2/2013 | Lindegren | H04W 28/0226 455/456.3 |
| 2014/0364154 A1* | 12/2014 | Sawamoto | H04W 48/04 455/456.5 |
| 2017/0280335 A1* | 9/2017 | Wilhelm | H04L 5/0058 |
| 2018/0310320 A1* | 10/2018 | Gibson | H04W 28/0231 |
| 2022/0159512 A1 | 5/2022 | Kudo et al. | |

(Continued)

FOREIGN PATENT DOCUMENTS

| | | | |
|---|---|---|---|
| JP | 2008-199451 A | | 8/2008 |
| JP | 2008199381 A | * | 8/2008 |
| JP | 2014-116814 A | | 6/2014 |

(Continued)

*Primary Examiner* — Jenkey Van
(74) *Attorney, Agent, or Firm* — Sughrue Mion, PLLC

(57) ABSTRACT

A communication system performs a communication between a moving body capable of using multiple communication carriers and an external device. The communication system acquires actual communication quality information that is acquired in real time from a communication device group present in a first area located in a direction of movement of the moving body and indicates an actual measured value of a communication quality of each of the multiple communication carriers in the first area. The communication system determines priority of the multiple communication carriers in the first area based on the actual communication quality information regarding the first area. The communication system determines, based on the priority, at least one communication carrier to be used for the communication between the moving body and the external device in the first area.

4 Claims, 13 Drawing Sheets

(56) References Cited

U.S. PATENT DOCUMENTS

2023/0209588 A1* 6/2023 Hoshino .......... G08G 1/096775
　　　　　　　　　　　　　　　　　　　　　370/329
2023/0328824 A1* 10/2023 Patel .................... H04W 76/15
　　　　　　　　　　　　　　　　　　　　　370/329

FOREIGN PATENT DOCUMENTS

| | | |
|---|---|---|
| JP | 2017-175296 A | 9/2017 |
| JP | 2022-39801 A | 3/2022 |
| WO | 2008/105091 A1 | 9/2008 |
| WO | 2013/046673 A1 | 4/2013 |
| WO | 2020/174986 A1 | 9/2020 |
| WO | 2020/217459 A1 | 10/2020 |

* cited by examiner

COMMUNICATION CONTROL METHOD AND COMMUNICATION SYSTEM

CROSS-REFERENCES TO RELATED APPLICATION

The present disclosure claims priority to Japanese Patent Application No. 2022-122739, filed on Aug. 1, 2022, the contents of which application are incorporated herein by reference in their entirety.

TECHNICAL FIELD

The present disclosure relates to a technique for controlling a communication between a moving body capable of using multiple communication carriers and an external device.

BACKGROUND ART

Patent Literature 1 discloses a communication device. The communication device generates device information including its own position information and collects surrounding environment information. The communication device includes a communication unit that communicates with an external communication device, a communication prediction unit that predicts a communication quality of the communication unit based on the device information and the surrounding environment information, and a communication control unit that controls communication setting of the communication unit based on the communication quality predicted by the communication prediction unit.

LIST OF RELATED ART

Patent Literature 1: International Publication No. WO2020/217459

SUMMARY

A communication between a moving body capable of using multiple communication carriers and an external device is considered. In such the communication, it is conceivable to compare communication qualities of the multiple communication carriers and select a communication carrier to be used. The communication quality of each communication carrier can be predicted based on, for example, past communication record. However, accuracy of the predicted value of the communication quality based on the past communication record is not necessarily high. When the accuracy of the predicted value of the communication quality is low, a communication carrier with low quality may be selected.

An object of the present disclosure is to provide a technique capable of appropriately determining a communication carrier to be used in a communication between a moving body capable of using multiple communication carriers and an external device.

A first aspect relates to a communication control method of controlling a communication between a moving body capable of using multiple communication carriers and an external device.

The communication control method includes:
acquiring actual communication quality information that is acquired in real time from a communication device group present in a first area located in a direction of movement of the moving body and indicates an actual measured value of a communication quality of each of the multiple communication carriers in the first area;
priority determination processing that determines priority of the multiple communication carriers in the first area based on the actual communication quality information regarding the first area; and
determining, based on the priority, at least one communication carrier to be used for the communication between the moving body and the external device in the first area.

A second aspect relates to a communication system that performs a communication between a moving body capable of using multiple communication carriers and an external device.

The communication system includes one or more processors.

The one or more processors are configured to execute:
acquiring actual communication quality information that is acquired in real time from a communication device group present in a first area located in a direction of movement of the moving body and indicates an actual measured value of a communication quality of each of the multiple communication carriers in the first area;
priority determination processing that determines priority of the multiple communication carriers in the first area based on the actual communication quality information regarding the first area; and
determining, based on the priority, at least one communication carrier to be used for the communication between the moving body and the external device in the first area.

A third aspect relates to a communication system.

The communication system includes:
a moving body capable of using multiple communication carriers;
an external device configured to communicate with the moving body; and
a management device configured to communicate with the moving body and the external device.

At least one of of the moving body, the external device, and the management device acquires actual communication quality information that is acquired in real time from a communication device group present in a first area located in a direction of movement of the moving body and indicates an actual measured value of a communication quality of each of the multiple communication carriers in the first area.

At least one of of the moving body, the external device, and the management device executes priority determination processing that determines priority of the multiple communication carriers in the first area based on the actual communication quality information regarding the first area.

At least one of of the moving body, the external device, and the management device determines, based on the priority, at least one communication carrier to be used for the communication between the moving body and the external device in the first area.

According to the present disclosure, the actual measured value of the communication quality of each of the multiple communication carriers is acquired in real time from the communication device group present in the first area located in the direction of movement of the moving body. Then, a communication carrier used for the communication in the first area is determined based on the acquired actual measured value of the communication quality. This makes it possible to more accurately select a high-quality communication carrier as compared with a case where a communication carrier is determined based only on a predicted value of the communication quality. In other words, it is possible to more appropriately determine a communication carrier to be used.

DETAILED DESCRIPTION

Embodiments of the present disclosure will be described with reference to the accompanying drawings.
1. Overview of Communication System A communication between a moving body and an external device is considered. Examples of the moving body include a vehicle, a robot, a flying object, and the like. The vehicle may be an autonomous driving vehicle or may be a vehicle driven by a driver. Examples of the robot include a logistics robot, a work robot, and the like. Examples of the flying object include an airplane, a drone, and the like.

As an example, in the following description, a case where the moving body is a vehicle will be considered. When generalizing, "vehicle" in the following description shall be deemed to be replaced with "moving body."

Figure 1:
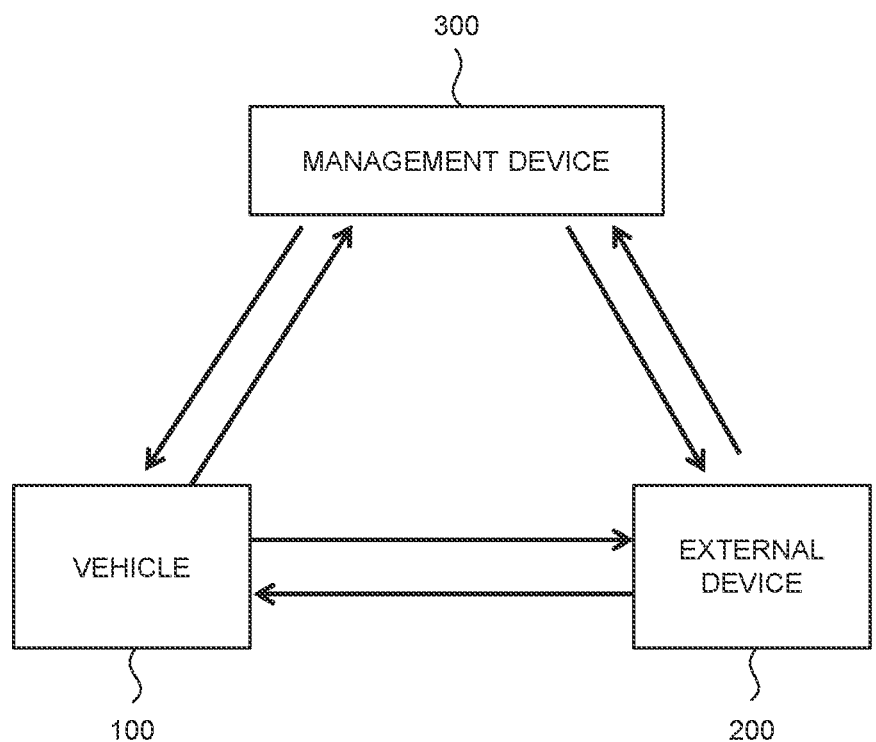
FIG. 1 is a block diagram for explaining an overview of a communication system according to an embodiment of the present disclosure.

FIG. 1 is a block diagram for explaining an overview of a communication system 1 according to the present embodiment. The communication system 1 includes a vehicle 100, an external device 200, and a management device 300. The external device 200 exists outside the vehicle 100. The management device 300 manages the communication system 1. The management device 300 may be a management server on a cloud. The management server may be configured by a plurality of servers that perform distributed processing. The vehicle 100, the external device 200, and the management device 300 are connected to each other via a communication network and are capable of communicating with each other. The vehicle 100 and the external device 200 directly communicate with each other or communicate with each other via the management device 300.

The vehicle 100 has a wireless communication function and is capable of using multiple communication carriers T1 to Tn. Here, n is an integer equal to or greater than 2. The multiple communication carriers T1 to Tn can also be referred to as multiple communication methods or multiple communication lines. Examples of the communication method include a common cellular method provided by MNO (Mobile Network Operator), an inexpensive cellular method provided by MVNO (Mobile Virtual Network Operator), a wireless LAN (Local Area Network) method, and the like. A communication cost differs among the multiple types of communication methods. In the example above, the wireless LAN method is the lowest and the common cellular method is the highest.

When the external device 200 has a wireless communication function, the external device 200 may also be capable of using the multiple communication carriers T1 to Tn.
2. Overview of Remote Operation System As an example, a case where the communication system 1 is a "remote operation system" that performs a remote operation of the vehicle 100 will be considered.

Figure 2:
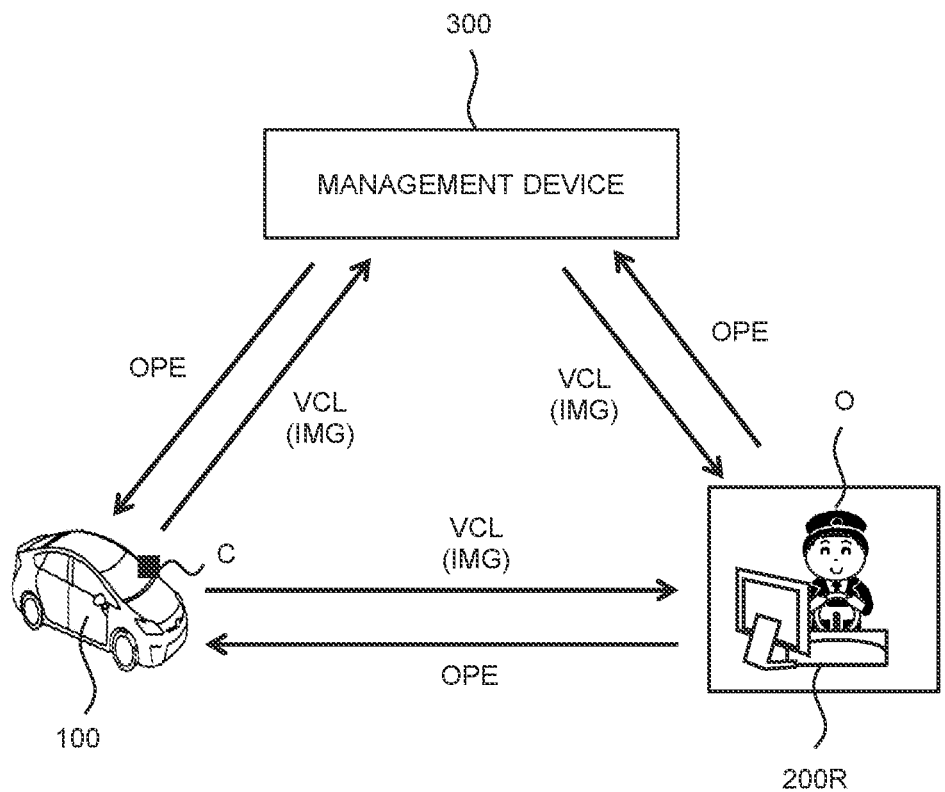
FIG. 2 is a conceptual diagram for explaining an overview of a remote operation system according to an embodiment of the present disclosure.

FIG. 2 is a schematic diagram showing a configuration example of the remote operation system. The remote operation system includes the vehicle 100, a remote operator terminal 200R, and the management device 300. The vehicle 100 is a target of the remote operation. The remote operator terminal 200R is a terminal device used by a remote operator O when remotely operating the vehicle 100. The remote operator terminal 200R can also be referred to as a remote operation human machine interface (HMI). The remote operator terminal 200R corresponds to the external device 200 that is a communication partner of the vehicle 100.

The management device 300 manages the remote operation system. Typically, the management device 300 is a management server on a cloud. The management server may be configured by a plurality of servers that perform distributed processing.

The vehicle 100, the remote operator terminal 200R, and the management device 300 are capable of communicating with each other via a communication network. For example, the vehicle 100 and the remote operator terminal 200R communicate with each other via the management device 300. Alternatively, the vehicle 100 and the remote operator terminal 200R may directly communicate with each other without through the management device 300.

Various sensors including a camera C are installed on the vehicle 100. The camera C images a situation around the vehicle 100 to acquire an image IMG indicating the situation around the vehicle 100. Vehicle information VCL is information acquired by the various sensors. For example, the vehicle information VCL includes the image IMG captured by the camera C. The vehicle information VCL may include a position and a state (for example, a speed, a steering angle, and the like) of the vehicle 100. The vehicle 100 transmits the vehicle information VCL to the remote operator terminal 200R.

The remote operator terminal 200R receives the vehicle information VCL transmitted from the vehicle 100. The remote operator terminal 200R presents the vehicle information VCL to the remote operator O. More specifically, the remote operator terminal 200R includes a display device, and displays the image IMG and the like on the display device. The remote operator O views the displayed information, recognizes the situation around the vehicle 100, and performs the remote operation of the vehicle 100. Remote operation information OPE is information relating to the remote operation performed by the remote operator O. For example, the remote operation information OPE includes an amount of operation performed by the remote operator O. The remote operator terminal 200R transmits the remote operation information OPE to the vehicle 100.

The vehicle 100 receives the remote operation information OPE transmitted from the remote operator terminal 200R. The vehicle 100 performs vehicle travel control in accordance with the received remote operation information OPE. In this manner, the remote operation of the vehicle 100 is realized.

2-1. Configuration Example of Vehicle

Figure 3:
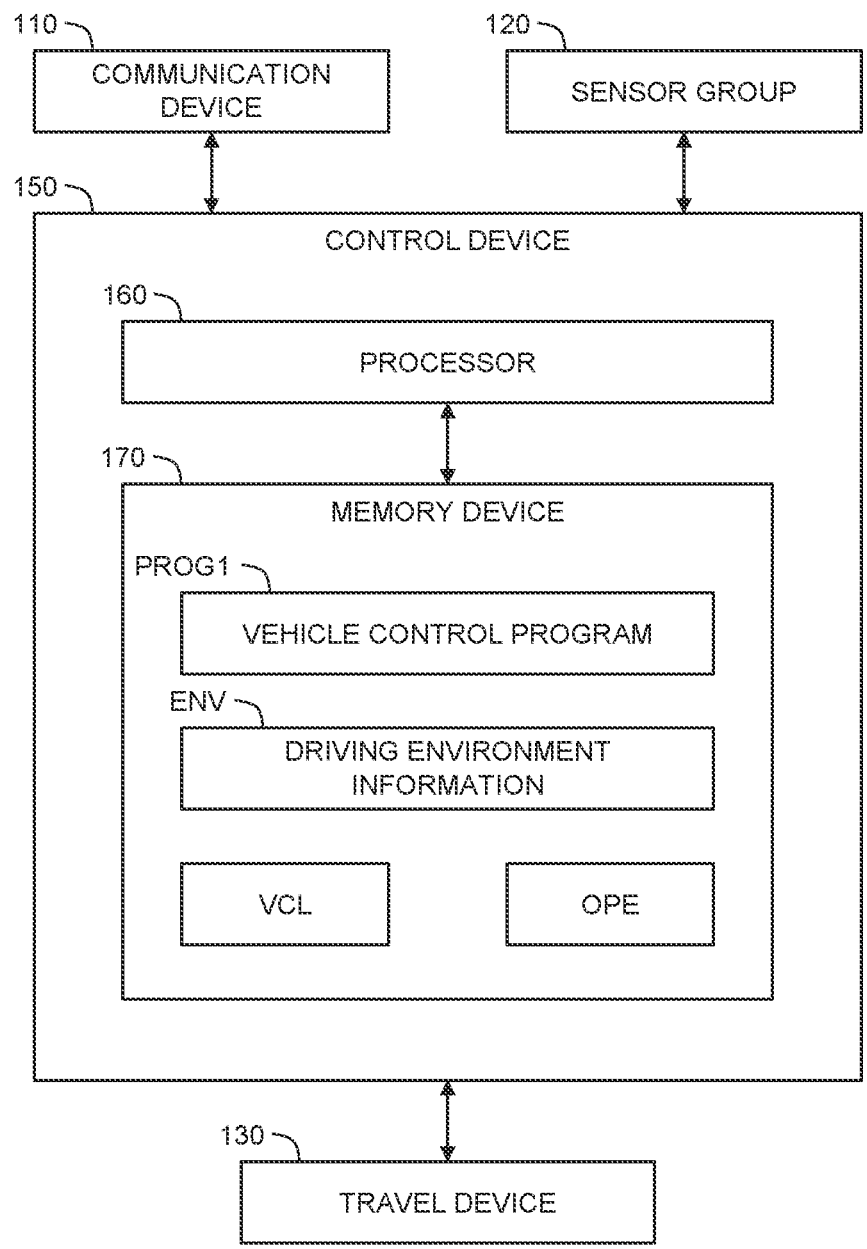
FIG. 3 is a block diagram showing a configuration example of a vehicle according to an embodiment of the present disclosure.

FIG. 3 is a block diagram showing a configuration example of the vehicle 100. The vehicle 100 includes a communication device 110, a sensor group 120, a travel device 130, and a control device (controller) 150.

The communication device 110 communicates with the outside of the vehicle 100. For example, the communication device 110 communicates with the remote operator terminal 200R and the management device 300. The communication device 110 can perform the communication by using the multiple communication carriers T1 to Tn.

The sensor group 120 includes a recognition sensor, a vehicle state sensor, a position sensor, and the like. The recognition sensor recognizes (detects) a situation around the vehicle 100. Examples of the recognition sensor include the camera C, a laser imaging detection and ranging (LIDAR), a radar, and the like. The vehicle state sensor detects a state of the vehicle 100. Examples of the vehicle state sensor include a speed sensor, an acceleration sensor, a yaw rate sensor, a steering angle sensor, a gear position sensor, and the like. The position sensor detects a position and an orientation of the vehicle 100. For example, the position sensor includes a global navigation satellite system (GNSS).

The travel device 130 includes a steering device, a driving device, and a braking device. The steering device turns wheels. For example, the steering device includes an electric power steering (EPS) device. The driving device is a power source that generates a driving force. Examples of the drive device include an engine, an electric motor, an in-wheel motor, and the like. The braking device generates a braking force.

The control device 150 is a computer that controls the vehicle 100. The control device 150 includes one or more processors 160 (hereinafter simply referred to as a processor 160) and one or more memory devices 170 (hereinafter simply referred to as a memory device 170). The processor 160 executes a variety of processing. For example, the processor 160 includes a central processing unit (CPU). The memory device 170 stores a variety of information necessary for the processing by the processor 160. Examples of the memory device 170 include a volatile memory, a non-volatile memory, a hard disk drive (HDD), a solid state drive (SSD), and the like. The control device 150 may include one or more electronic control units (ECUs).

A vehicle control program PROG1 is a computer program executed by the processor 160. The functions of the control device 150 are implemented by the processor 160 executing the vehicle control program PROG1. The vehicle control program PROG1 is stored in the memory device 170. The vehicle control program PROG1 may be recorded on a non-transitory computer-readable recording medium.

The control device 150 uses the sensor group 120 to acquire driving environment information ENV indicating a driving environment for the vehicle 100. The driving environment information ENV is stored in the memory device 170.

The driving environment information ENV includes surrounding situation information indicating a result of recognition by the recognition sensor. For example, the surrounding situation information includes the image IMG captured by the camera C. The surrounding situation information further includes object information regarding an object around the vehicle 100. Examples of the object around the vehicle 100 include a pedestrian, another vehicle, a white line, a traffic signal, a sign, a roadside structure, and the like. The object information indicates a relative position and a relative velocity of the object with respect to the vehicle 100.

In addition, the driving environment information ENV includes vehicle state information indicating the vehicle state detected by the vehicle state sensor.

Furthermore, the driving environment information ENV includes vehicle position information indicating the position and the orientation of the vehicle 100. The vehicle position information is acquired by the position sensor. Highly accurate vehicle position information may be acquired by performing a well-known localization using map information and the surrounding situation information (the object information).

The control device 150 executes vehicle travel control that controls travel of the vehicle 100. The vehicle travel control includes steering control, driving control, and braking control. The control device 150 executes the vehicle travel control by controlling the travel device 130 (i.e., the steering device, the driving device, and the braking device).

The control device 150 may execute autonomous driving control based on the driving environment information ENV. More specifically, the control device 150 generates a travel plan of the vehicle 100 based on the driving environment information ENV. Further, the control device 150 generates, based on the driving environment information ENV, a target trajectory required for the vehicle 100 to travel in accordance with the travel plan. The target trajectory includes a target position and a target speed. Then, the control device 150 executes the vehicle travel control such that the vehicle 100 follows the target trajectory.

The control device 150 communicates with the remote operator terminal 200R via the communication device 110.

The control device 150 transmits the vehicle information VCL to the remote operator terminal 200R. The vehicle information VCL is information necessary for the remote operation by the remote operator O, and includes at least a part of the driving environment information ENV described above. For example, the vehicle information VCL includes the surrounding situation information (especially, the image IMG). The vehicle information VCL may further include the vehicle state information and the vehicle position information.

In addition, the control device 150 receives the remote operation information OPE from the remote operator terminal 200R. The remote operation information OPE is information regarding the remote operation by the remote operator O. For example, the remote operation information OPE includes an amount of operation performed by the remote operator O. The control device 150 performs the vehicle travel control in accordance with the received remote operation information OPE.

2-2. Configuration Example of Remote Operator Terminal

Figure 4:
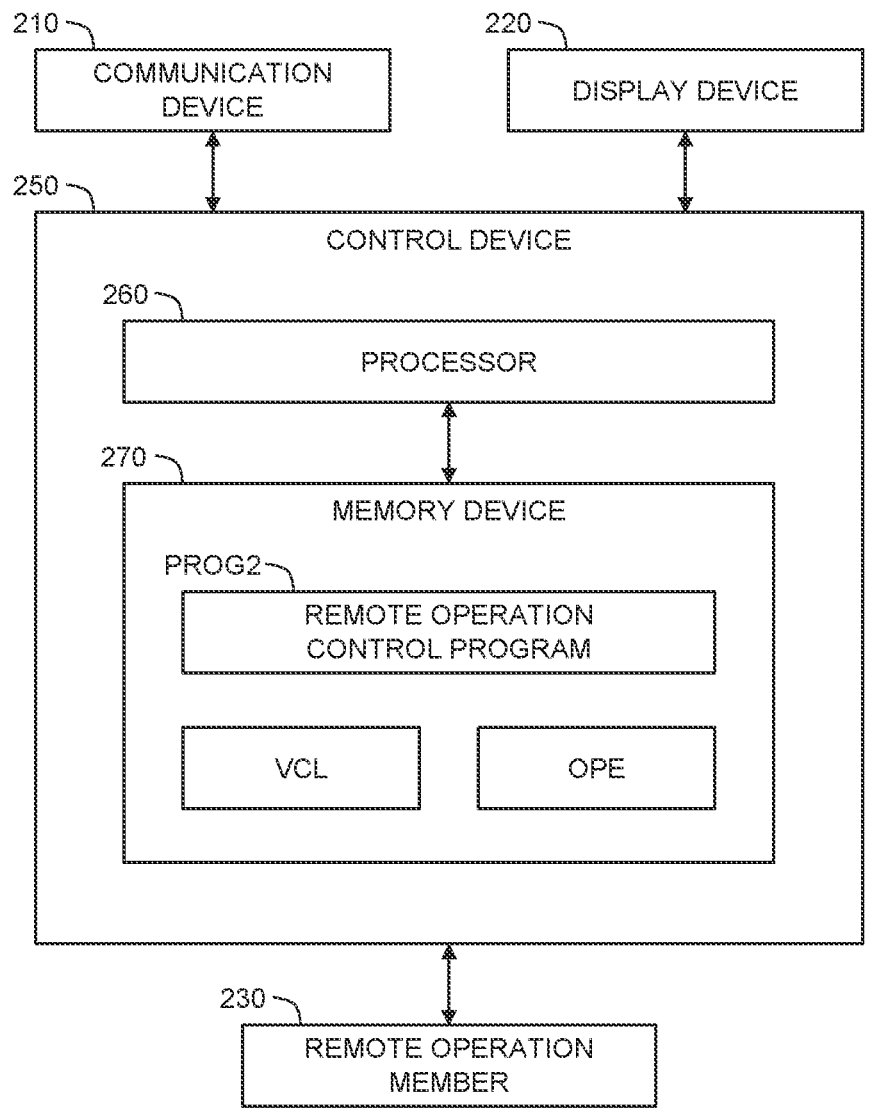
FIG. 4 is a block diagram showing a configuration example of a remote operator terminal according to an embodiment of the present disclosure.

FIG. 4 is a block diagram showing a configuration example of the remote operator terminal 200R. The remote operator terminal 200R includes a communication device 210, a display device 220, a remote operation member 230, and a control device (controller) 250.

The communication device 210 communicates with the vehicle 100 and the management device 300.

The display device 220 presents a variety of information to the remote operator O by displaying the variety of information.

The remote operation member 230 is a member operated by the remote operator O when remotely operating the vehicle 100. The remote operation member 230 includes a steering wheel, an accelerator pedal, a brake pedal, a direction indicator, and the like.

The control device 250 controls the remote operator terminal 200R. The control device 250 includes one or more processors 260 (hereinafter simply referred to as a processor 260) and one or more memory devices 270 (hereinafter simply referred to as a memory device 270). The processor 260 executes a variety of processing. For example, the processor 260 includes a CPU. The memory device 270 stores a variety of information necessary for the processing by the processor 260. Examples of the memory device 270 include a volatile memory, a non-volatile memory, an HDD, an SSD, and the like.

A remote operation program PROG2 is a computer program executed by the processor 260. The functions of the control device 250 are implemented by the processor 260 executing the remote operation program PROG2. The remote operation program PROG2 is stored in the memory device 270. The remote operation program PROG2 may be recorded on a non-transitory computer-readable recording medium. The remote operation program PROG2 may be provided via a network.

The control device 250 communicates with the vehicle 100 via the communication device 210. The control device 250 receives the vehicle information VCL transmitted from the vehicle 100. The control device 250 presents the vehicle information VCL to the remote operator O by displaying the vehicle information VCL on the display device 220. The remote operator O is able to recognize the state of the vehicle 100 and the situation around the vehicle 100 based on the vehicle information VCL displayed on the display device 220.

The remote operator O operates the remote operation member 230. The amount of operation of the remote operation member 230 is detected by a sensor installed in the remote operation member 230. The control device 250 generates the remote operation information OPE reflecting the amount of operation of the remote operation member 230 performed by the remote operator O. Then, the control device 250 transmits the remote operation information OPE to the vehicle 100 via the communication device 210.

3. Overview of Communication Carrier Determination Processing

As described above, the vehicle 100 is capable of using the multiple communication carriers T1 to Tn. The communication system 1 determines at least one communication carrier to be used for the communication between the vehicle 100 and the external device 200. This processing is hereinafter referred to as "communication carrier determination processing."

Figure 5:
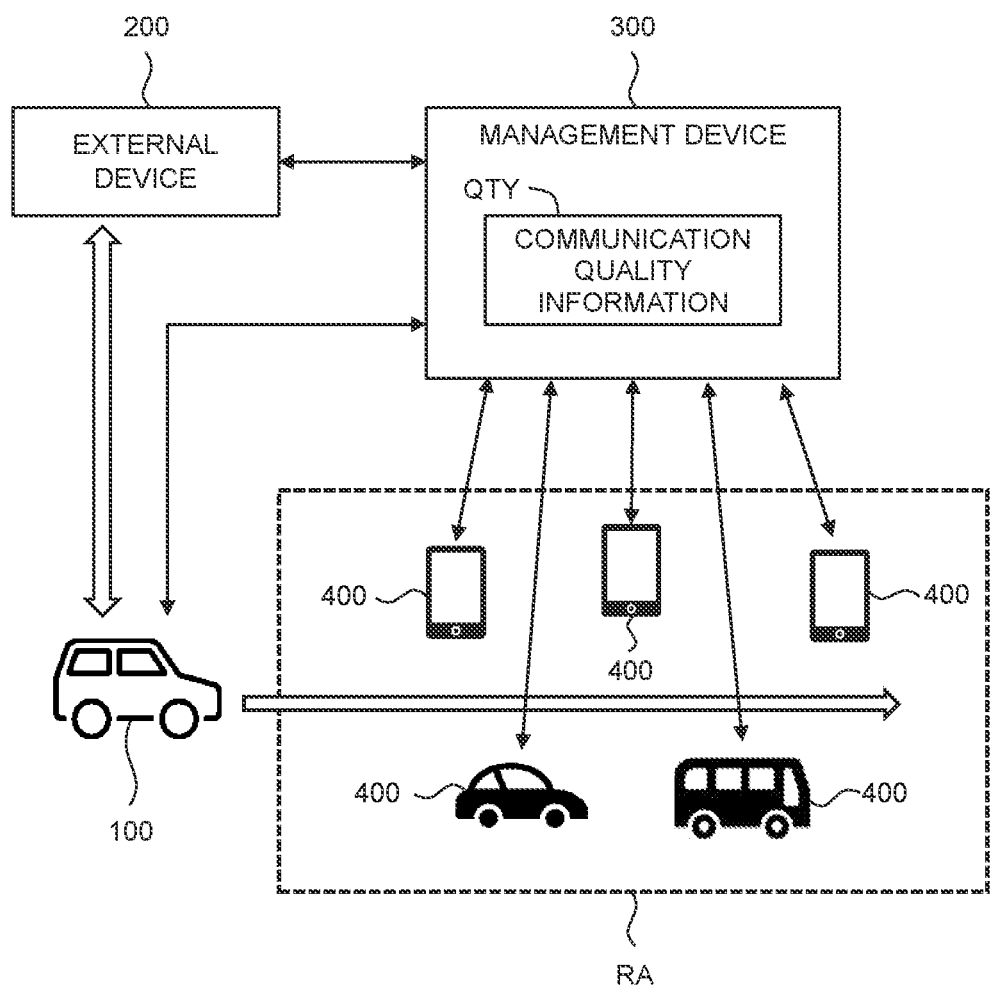
FIG. 5 is a conceptual diagram for explaining an overview of communication carrier determination processing according to an embodiment of the present disclosure.

FIG. 5 is a conceptual diagram for explaining an overview of the communication carrier determination processing according to the present embodiment. The management device 300 holds "communication quality information QTY" indicating communication qualities of a variety of communication carriers at a variety of positions. Examples of the communication quality include a communication speed, a round trip time (RTT), a received signal strength indicator (RSSI), jitter, and the like.

In particular, the communication quality information QTY includes "actual communication quality information QTY-A." The actual communication quality information QTY-A indicates actual measured values of the communication qualities of a variety of communication carriers at a variety of positions. The actual measured values of the communication qualities are measured in real time by communication devices 400 present at a variety of positions. Examples of the communication device 400 include a mobile terminal and a vehicle. The mobile terminal is exemplified by a smartphone.

More specifically, the communication device 400 has a wireless communication function and is capable of using at least one of the multiple communication carriers T1 to Tn. The communication device 400 performs a communication by using at least one communication carrier. During the communication, the communication device 400 measures in real time a communication quality of the communication by the communication carrier. A method of measuring the communication quality is well known. The communication device 400 transmits information indicating its position and the real time actual measured value of the communication quality to the management device 300. The management device 300 can generate and update the actual communication quality information QTY-A by collecting the information from a variety of communication devices 400 at a variety of positions.

A first area RA is an area located in a direction of movement of the vehicle 100. In other words, the first area RA is an area in which the vehicle 100 will travel in the near future. For example, the first area RA is an area having a length of about several kilometers.

The actual communication quality information QTY-A regarding the first area RA indicates the actual measured values of the communication qualities of the multiple communication carriers T1 to Tn in the first area RA. The actual measured values are acquired in real time from one or more communication devices 400 (a communication device group) present in the first area RA. That is, the management device 300 acquires the actual communication quality information QTY-A regarding the first area RA from the one or more communication devices 400 (the communication device group) present in the first area RA. The vehicle 100 and the external device 200 can acquire the actual communication quality information QTY-A regarding the first area RA from the management device 300. It can be said that the actual communication quality information QTY-A acquired by the vehicle 100 and the external device 200 indicates a quasi-real time actual measured value of the communication quality.

The communication system 1 performs the communication carrier determination processing for the first area RA based on the actual communication quality information QTY-A for the first area RA. For example, at least one of the vehicle 100, the external device 200, and the management device 300 determines priority of the multiple communication carriers T1 to Tn in the first area RA based on the actual communication quality information QTY-A regarding the first area RA. Typically, a communication carrier having a higher actual measured value of the communication quality has a higher priority. Then, at least one of the vehicle 100, the external device 200, and the management device 300 determines at least one communication carrier to be used for the communication between the vehicle 100 and the external device 200 in the first area RA based on the priority.

A result of the communication carrier determination processing is notified to vehicle 100. The vehicle 100 communicates with the external device 200 by using the determined communication carrier.

Effects

As described above, according to the present embodiment, the actual measured value of the communication quality of each of the multiple communication carriers T1 to Tn is acquired in real time from the communication device group present in the first area RA located in the direction of movement of the vehicle 100. Then, a communication carrier to be used for the communication in the first area RA is determined based on the acquired actual measured value of the communication quality. This makes it possible to more accurately select a high-quality communication carrier as compared with a case where a communication carrier is determined based only on a predicted value of the communication quality. In other words, it is possible to more appropriately determine a communication carrier to be used.

In the case of the remote operation system shown in FIG. 2, information (VCL, OPE) required for the remote operation of the vehicle 100 is communicated via the high-quality communication carrier. Therefore, accuracy of the remote operation of the vehicle 100 is improved.

4. Processing Related to Communication Carrier Determination Processing

Figure 6:
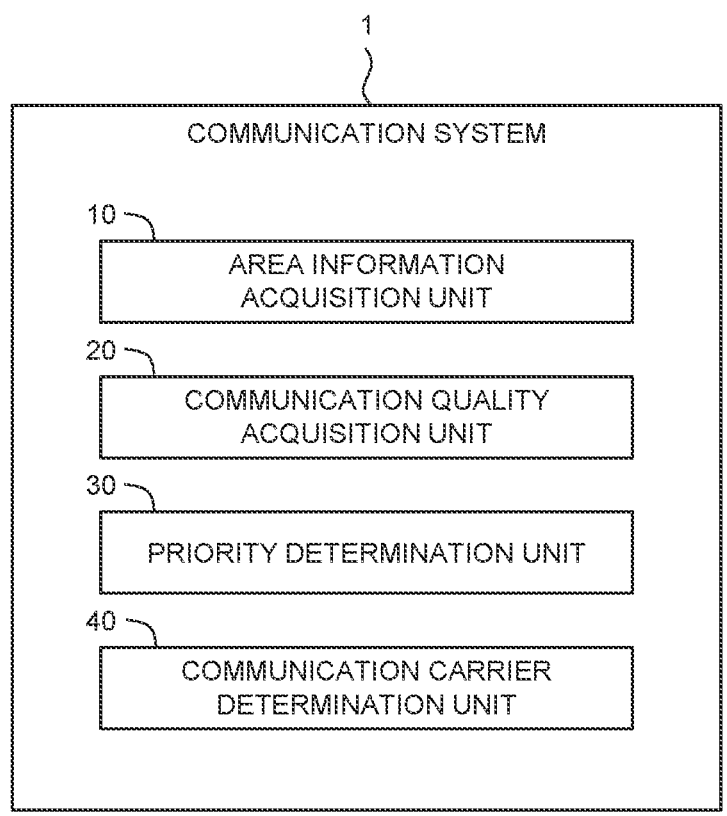
FIG. 6 is a block diagram showing a functional configuration example of a communication system according to an embodiment of the present disclosure.

FIG. 6 is a block diagram showing a functional configuration example of the communication system 1 according to the present embodiment. The communication system 1 includes, as functional blocks, an area information acquisition unit 10, a communication quality acquisition unit 20, a priority determination unit 30, and a communication carrier determination unit 40. These functional blocks are included in at least one of the vehicle 100, the external device 200, and the management device 300. These functional blocks may be distributed to the vehicle 100, the external device 200, and the management device 300. Since the vehicle 100, the external device 200, and the management device 300 are capable of communicating with each other, information necessary for the processing can be shared among the vehicle 100, the external device 200, and the management device 300.

To generalize, the area information acquisition unit 10, the communication quality acquisition unit 20, the priority determination unit 30, and the communication carrier determination unit 40 are realized by one or more processors executing a variety of information processing and one or more memory devices storing a variety of information necessary for the processing.

Figure 7:
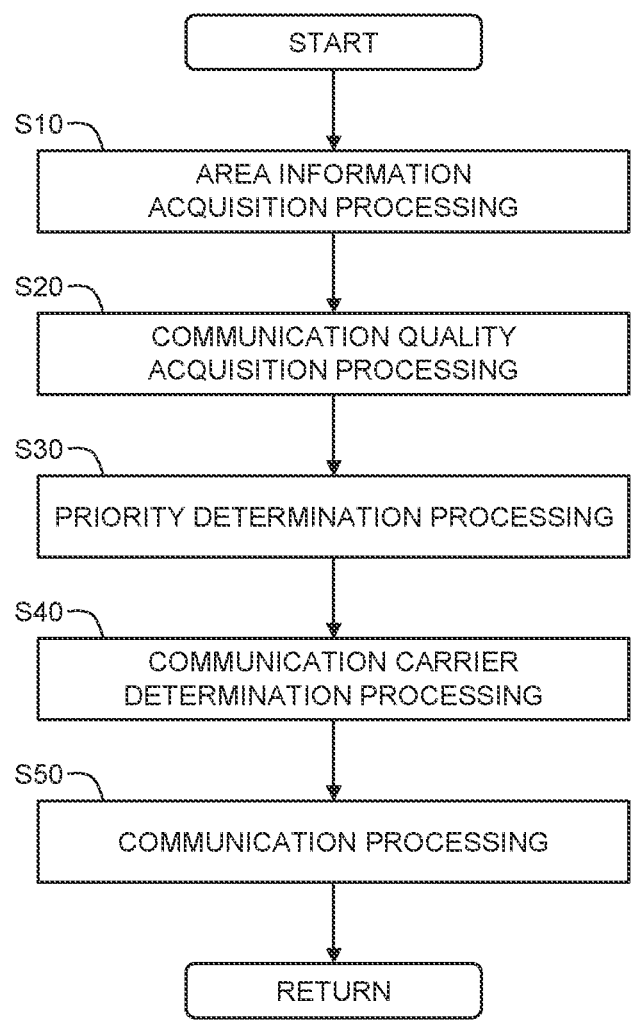
FIG. 7 is a flowchart showing processing performed by a communication system according to an embodiment of the present disclosure.

FIG. 7 is a flowchart showing processing performed by the communication system 1 according to the present embodiment. Each processing will be described below.

4-1. Area Information Acquiring Processing (Step S10)

In Step S10, the area information acquisition unit 10 acquires information on the first area RA located in the direction of movement of the vehicle 100. More specifically, the area information acquisition unit 10 acquires information on a current position and the direction of movement of the vehicle 100 from the vehicle 100. Instead of or together with the direction of movement, information on a target route of the vehicle 100 may be acquired. The area information acquisition unit 10 recognizes the first area RA based on the current position and the direction of movement or the target route of the vehicle 100. The first area RA is, for example, an area having a length of about several kilometers.

4-2. Communication Quality Acquisition Processing (Step S20)

Figure 8:
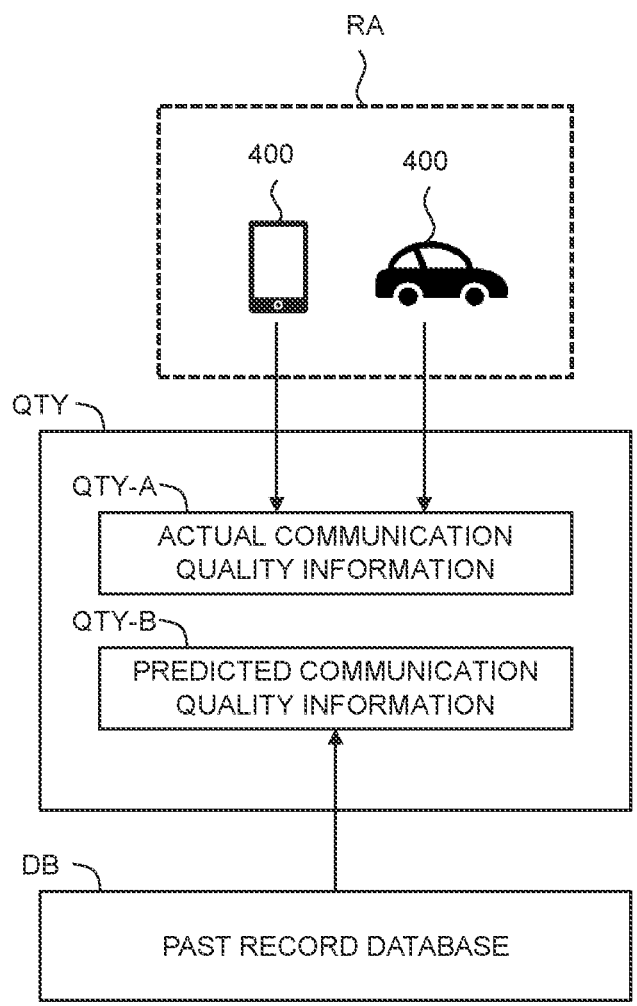
FIG. 8 is a conceptual diagram for explaining communication quality acquisition processing according to an embodiment of the present disclosure.

In Step S20, the communication quality acquisition unit 20 acquires the communication quality information QTY regarding the first area RA. FIG. 8 is a conceptual diagram for explaining the communication quality acquisition processing.

The communication quality acquisition unit 20 acquires the actual communication quality information QTY-A indicating the actual measured values of the communication qualities of the multiple communication carriers T1 to Tn in the first area RA. The actual measured values are acquired in real time from one or more communication devices 400 (a communication device group) present in the first area RA. In consideration of a communication time from the communication device 400 and the like, it can be said that the actual communication quality information QTY-A indicates a quasi-real time actual measured value of the communication quality.

The actual measured values of the communication qualities of all the multiple communication carriers T1 to Tn are not necessarily acquired sufficiently. Depending on the number of communication devices 400 present in the first area RA and the communication carrier used by the communication device 400, an actual measured value of a communication quality of a certain communication carrier may not be acquired sufficiently. When the number of samples of the actual measured value of the communication quality of a communication carrier Ti (i=1 to n) in the first area RA is equal to or greater than a threshold value, it is determined that the actual measured value of the communication quality of the communication carrier Ti is significant and available for the processing. On the other hand, when the number of samples of the actual measured value of the communication quality of a communication carrier Ti in the first area RA is less than the threshold value, it is determined that the actual measured value of the communication quality of the communication carrier Ti is not available.

A communication carrier whose actual measured value of the communication quality is not available is hereinafter referred to as a "lack-of-sample communication carrier." When a part of the multiple communication carriers T1 to Tn in the first area RA is the lack-of-sample communication carrier, the communication quality acquisition unit 20 may predict the communication quality of the lack-of-sample communication carrier in the first area RA. Predicted communication quality information QTY-B indicates a predicted value of the communication quality for each position.

More specifically, a past record database DB indicates records of past communication qualities of the multiple communication carriers T1 to Tn for each position. It can also be said that the past record database DB is a group of past actual communication quality information QTY-A. Typically, the management device 300 holds and updates the past record database DB. The communication quality acquisition unit 20 accesses the past record database DB regarding the first area RA to predict a current communication quality of the lack-of-sample communication carrier in the first area RA based on the past communication qualities in the first area RA. That is, the communication quality acquisition unit 20 accesses the past record database DB regarding the first area RA to acquire a predicted value of the communication quality of the lack-of-sample communication carrier in the first area RA. For example, the past communication quality is directly used as the predicted value of the current communication quality.

However, accuracy of the predicted value of the communication quality based on the past record database DB is not necessarily high. In order to improve the accuracy of the predicted value of the communication quality, the following method may be used.

Figure 9:
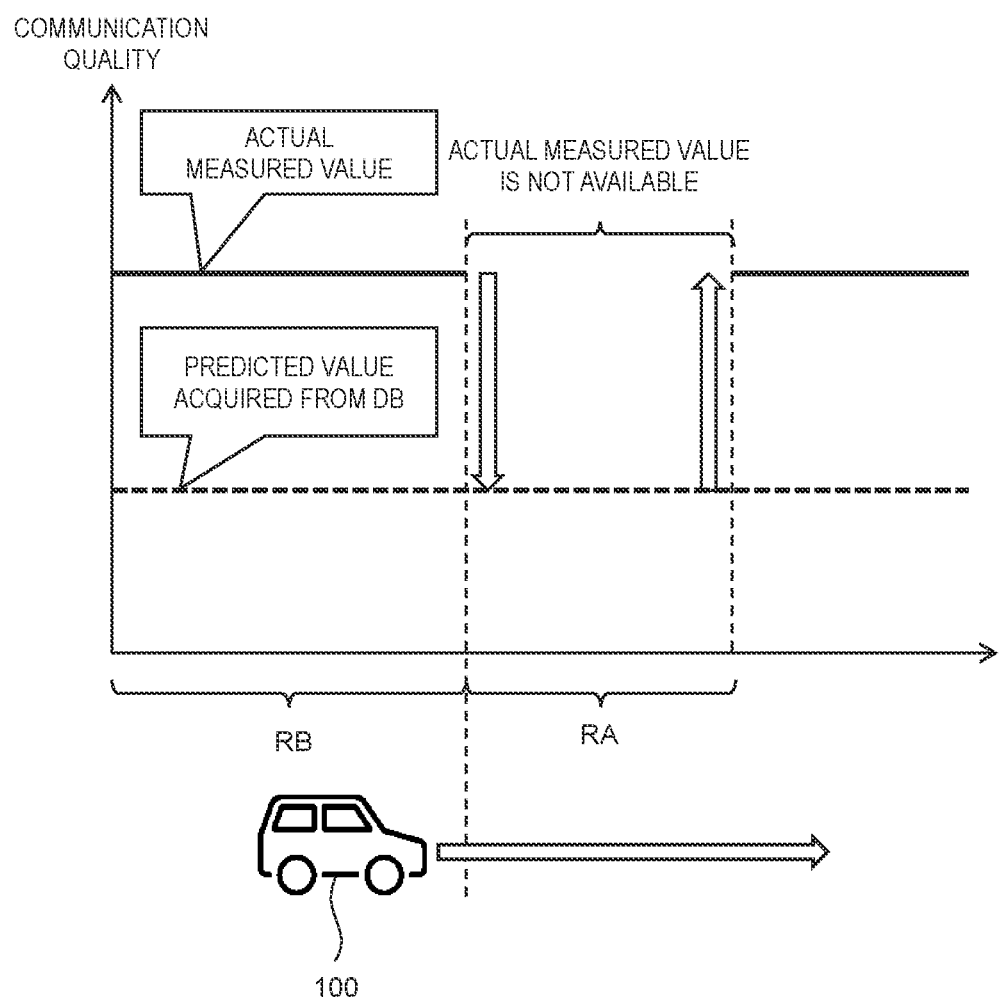
FIG. 9 is a conceptual diagram for explaining an example of communication quality acquisition processing according to an embodiment of the present disclosure.
Figure 10:
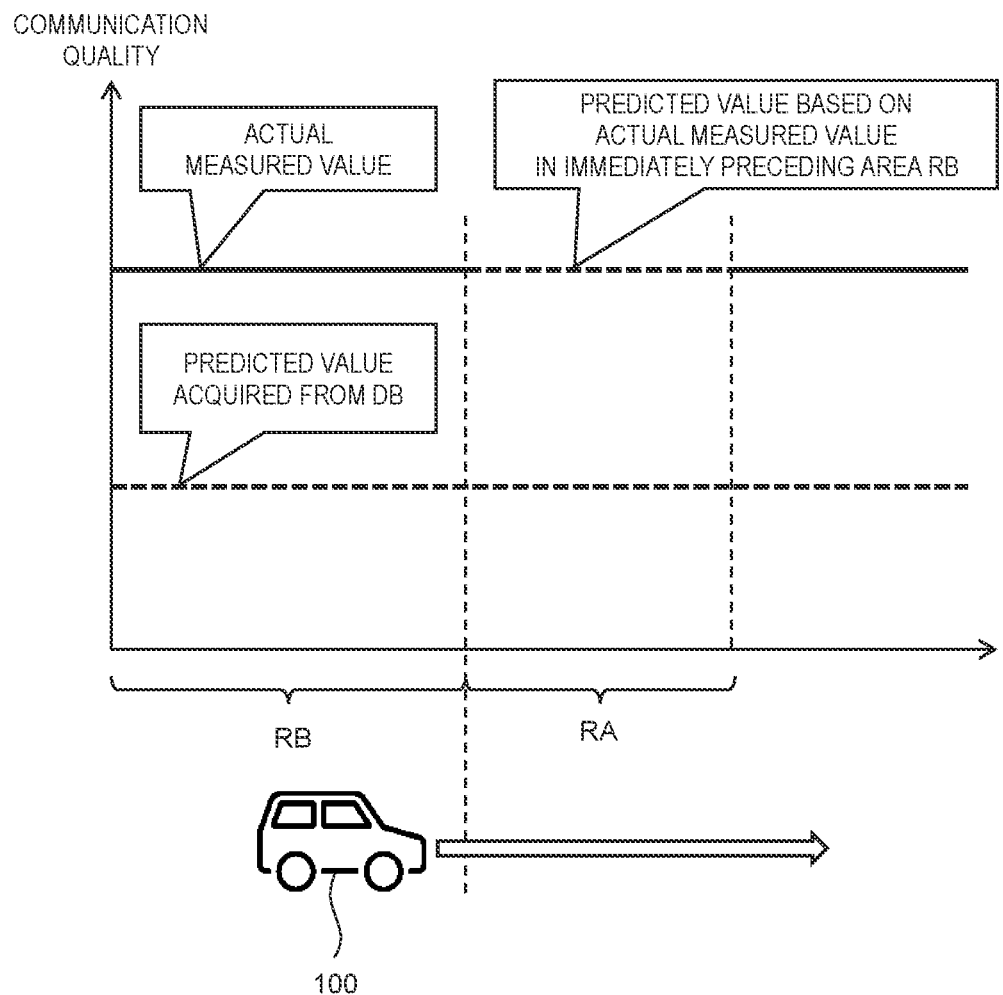
FIG. 10 is a conceptual diagram for explaining another example of communication quality acquisition processing according to an embodiment of the present disclosure.

FIGS. 9 and 10 are conceptual diagrams for explaining the method for improving the accuracy of the predicted value of the communication quality. A second area RB, which is an area in which the vehicle 100 is traveling, is located in front of the first area RA. In the second area RB, the vehicle 100 performs the communication by using a certain specific communication carrier Tj. In FIGS. 9 and 10, a vertical axis represents the communication quality of the specific communication carrier Tj, and a horizontal axis represents a position.

An actual measured value of the communication quality of the specific communication carrier Tj in the second area RB can be acquired from at least a result of the communication performed by the vehicle 100 itself. In the example s shown in FIGS. 9 and 10, the actual measured value of the communication quality in the second area RB deviates from the predicted value of the communication quality acquired from the past record database DB. That is, the accuracy of the predicted value of the communication quality acquired from the past record database DB is low.

The specific communication carrier Tj in the first area RA is the lack-of-sample communication carrier. That is, the actual measured value of the communication quality of the specific communication carrier Tj in the first area RA is not available. In the example shown in FIG. 9, the predicted value acquired from the past record database DB is used as the communication quality of the specific communication carrier Tj in the first area RA. However, as in the case of the second area RB, the predicted value of the communication quality acquired from the past record database DB may deviate from the actual measured value.

Therefore, a method as shown in FIG. 10 is used in order to improve the accuracy of the predicted value of the communication quality. More specifically, the communication quality acquisition unit 20 acquires the predicted value of the communication quality of the specific communication carrier Tj in the first area RA based on the actual measured value of the communication quality of the specific communication carrier Tj in the second area RB located in front of the first area RA. This is based on a knowledge that the communication quality of the specific communication carrier Tj in the second area RB is highly likely to continue even in the first area RA. The actual measured value of the communication quality of the specific communication carrier Tj in the second area RB is acquired from the result of communication performed by the vehicle 100 itself. For example, the communication quality acquisition unit 20 adopts the actual measured value of the communication quality of the specific communication carrier Tj in the second area RB as the predicted value of the communication quality of the specific communication carrier Tj in the first area RA. As another example, the communication quality acquisition unit 20 may calculate a weighted average value of the actual measured value of the communication quality in the second area RB and the past communication quality in the first area RA as the predicted value of the communication quality in the first area RA. A weight in the weighted average value may be arbitrarily set. In either case, the accuracy of the predicted value of the communication quality is improved.

4-3. Priority Determination Processing (Step S30)

In Step S30, the priority determination unit 30 determines the priority of the multiple communication carriers T1 to Tn in the first area RA based on the communication quality information QTY regarding the first area RA. There are various examples of information used in the priority determination processing.

When the actual measured values of the communication qualities of all the communication carriers T1 to Tn in the first area RA are available, the actual measured values are used. In this case, the priority determination unit 30 determines the priority of the multiple communication carriers T1 to Tn in the first area RA based on the actual communication quality information QTY-A.

When the actual measured values of the communication qualities of all the communication carriers T1 to Tn in the first area RA are not available, the above-described predicted values are used instead. In this case, the priority determination unit 30 determines the priority of the multiple communication carriers T1 to Tn in the first area RA based on the predicted communication quality information QTY-B.

When the actual measured value of the communication quality of a part of the communication carriers T1 to Tn in the first area RA is not available, only the available actual measured value is used. In this case, based on the actual communication quality information QTY-A, the priority determination unit 30 determines the priority of only the communication carriers whose actual measured values are available. A communication carrier whose actual measured value is not available is excluded from the candidates.

Alternatively, when the actual measured value of the communication quality of a part of the communication carriers T1 to Tn in the first area RA is not available, both the available actual measured value and the available predicted value may be used. In this case, the priority determination unit 30 determines the priority of the multiple communication carriers T1 to Tn in the first area RA based on the actual measured value indicated by the actual communication quality information QTY-A and the predicted value indicated by the predicted communication quality information QTY-B.

4-3-1. First Example of Priority Determination Processing

Figure 11:
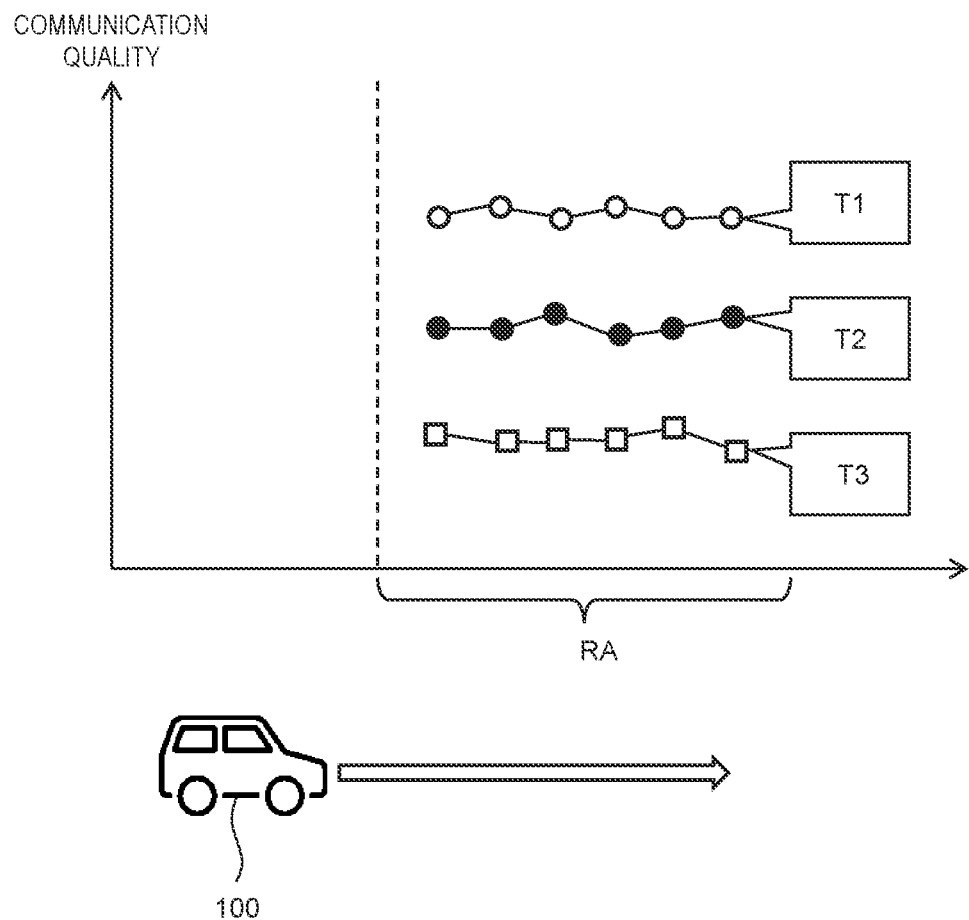
FIG. 11 is a conceptual diagram for explaining a first example of priority determination processing according to an embodiment of the present disclosure.

FIG. 11 is a conceptual diagram for explaining a first example of the priority determination processing. A vertical axis represents the communication quality and a horizontal axis represents the position. The communication quality is the actual measured value or the predicted value. Here, as an example, three communication carriers, a first communication carrier T1, a second communication carrier T2, and a third communication carrier T3 are considered.

As to the first communication carrier T1, there is information on the communication qualities at a plurality of first positions in the first area RA. The priority determination unit 30 calculates an average value of the communication qualities of the first communication carrier T1 at the plurality of first positions in the first area RA. The average value is hereinafter referred to as a "first average communication quality."

As to the second communication carrier T2, there is information on the communication qualities at a plurality of second positions in the first area RA. The priority determination unit 30 calculates an average value of the communication qualities of the second communication carrier T2 at the plurality of second positions in the first area RA. The average value is hereinafter referred to as a "second average communication quality."

As to the third communication carrier T3, there is information on the communication qualities at a plurality of third positions in the first area RA. The priority determination unit 30 calculates an average value of the communication qualities of the third communication carrier T3 at the plurality of third positions in the first area RA. The average value is hereinafter referred to as a "third average communication quality."

The priority determination unit 30 determines the priority of the communication carriers T1 to T3 by comparing the respective average communication qualities of the communication carriers T1 to T3. More specifically, the higher the average communication quality is, the higher the priority is set. In the example shown in FIG. 11, the first average communication quality is higher than the second average communication quality, and the second average communication quality is higher than the third average communication quality. Therefore, the priority determination unit 30 sets the priority of the first communication carrier T1 to be higher than the priority of the second communication carrier T2. In addition, the priority determination unit 30 sets the priority of the second communication carrier T2 to be higher than the priority of the third communication carrier T3.

4-3-2. Second Example of Priority Determination Processing

Figure 12:
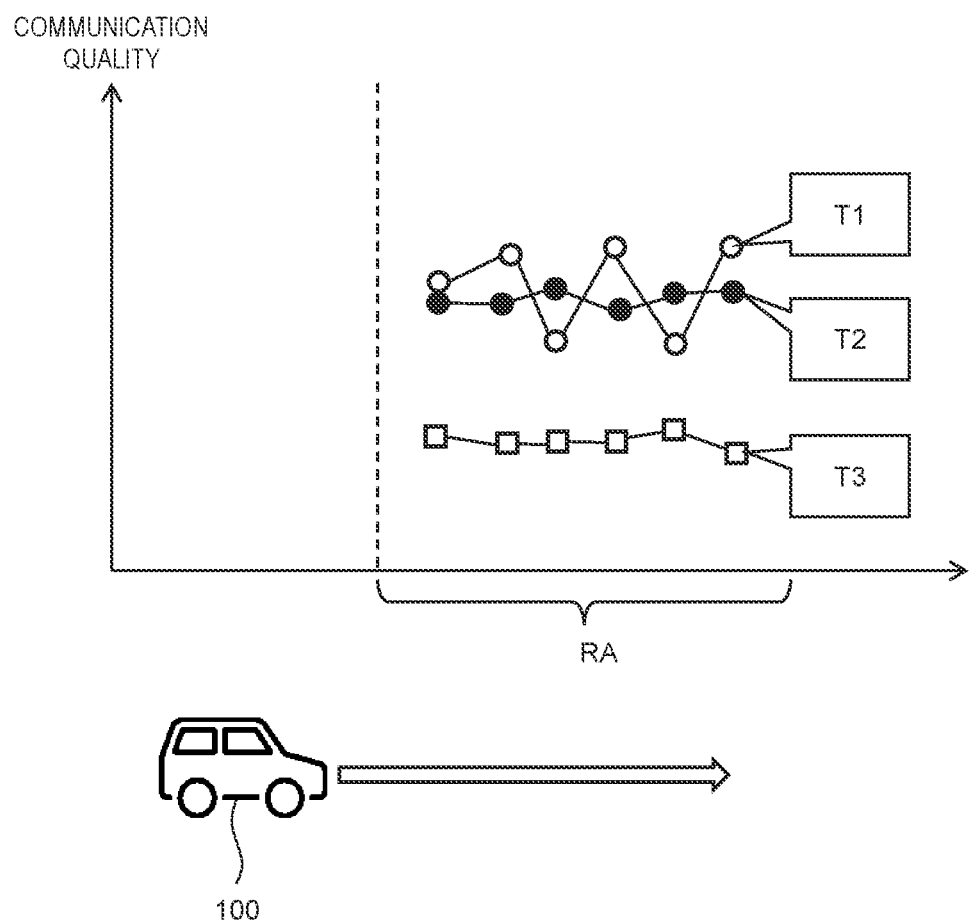
FIG. 12 is a conceptual diagram for explaining a second example of priority determination processing according to an embodiment of the present disclosure.

FIG. 12 is a conceptual diagram for explaining a second example of the priority determination processing. In the example shown in FIG. 12, there is no large difference between the first average communication quality and the second average communication quality. In this case, the priority determination unit 30 may determine the priority in consideration of a variation in the communication qualities in the first area RA.

A "variation parameter" is a parameter reflecting a variation in the communication qualities in the first area RA. For example, the variation parameter is variance of the communication qualities in the first area RA. As another example, the variation parameter is a standard deviation of the communication qualities in the first area RA.

A first variation parameter is the variation parameter reflecting the variation in the communication qualities of the first communication carrier T1 at the plurality of first positions in the first area RA. A second variation parameter is the variation parameter reflecting the variation in the communication qualities of the second communication carrier T2 at the plurality of second positions in the first area RA. The priority determination unit 30 calculates the first variation parameter and the second variation parameter. Then, the priority determination unit 30 compares the first variation parameter with the second variation parameter, and sets the priority of one of the first communication carrier T1 and the second communication carrier T2 having a smaller variation to be higher.

This can be generalized as follows. When the first average communication quality is higher than the second average communication quality by a predetermined value or more, the priority determination unit 30 sets the priority of the first communication carrier T1 to be higher than the priority of the second communication carrier T2. When the second average communication quality is higher than the first average communication quality by a predetermined value or more, the priority determination unit 30 sets the priority of the second communication carrier T2 to be higher than the priority of the first communication carrier T1. When a difference between the first average communication quality and the second average communication quality is less than the predetermined value, the priority determination unit 30 sets the priority of one of the first communication carrier T1 and the second communication carrier T2 having a smaller variation to be higher, based on the comparison between the first variation parameter and the second variation parameter.

4-4. Communication Carrier Determination Processing (Step S40)

In Step S40, the communication carrier determination unit 40 determines, based on the above-described priority, at least one communication carrier to be used for the communication between the vehicle 100 and the external device 200 in the first area RA.

For example, when one communication carrier is used, the communication carrier determination unit 40 selects the communication carrier having the highest priority.

As another example, multiple types of data may be transmitted in parallel via two or more communication carriers. In this case, the communication carrier determination unit 40 selects the two or more communication carriers according to the priority.

The communication carrier determination unit 40 may set data priority of the multiple types of data. In this case, the communication carrier determination unit 40 allocates data having a higher data priority to a communication carrier having a higher priority.

Figure 13:
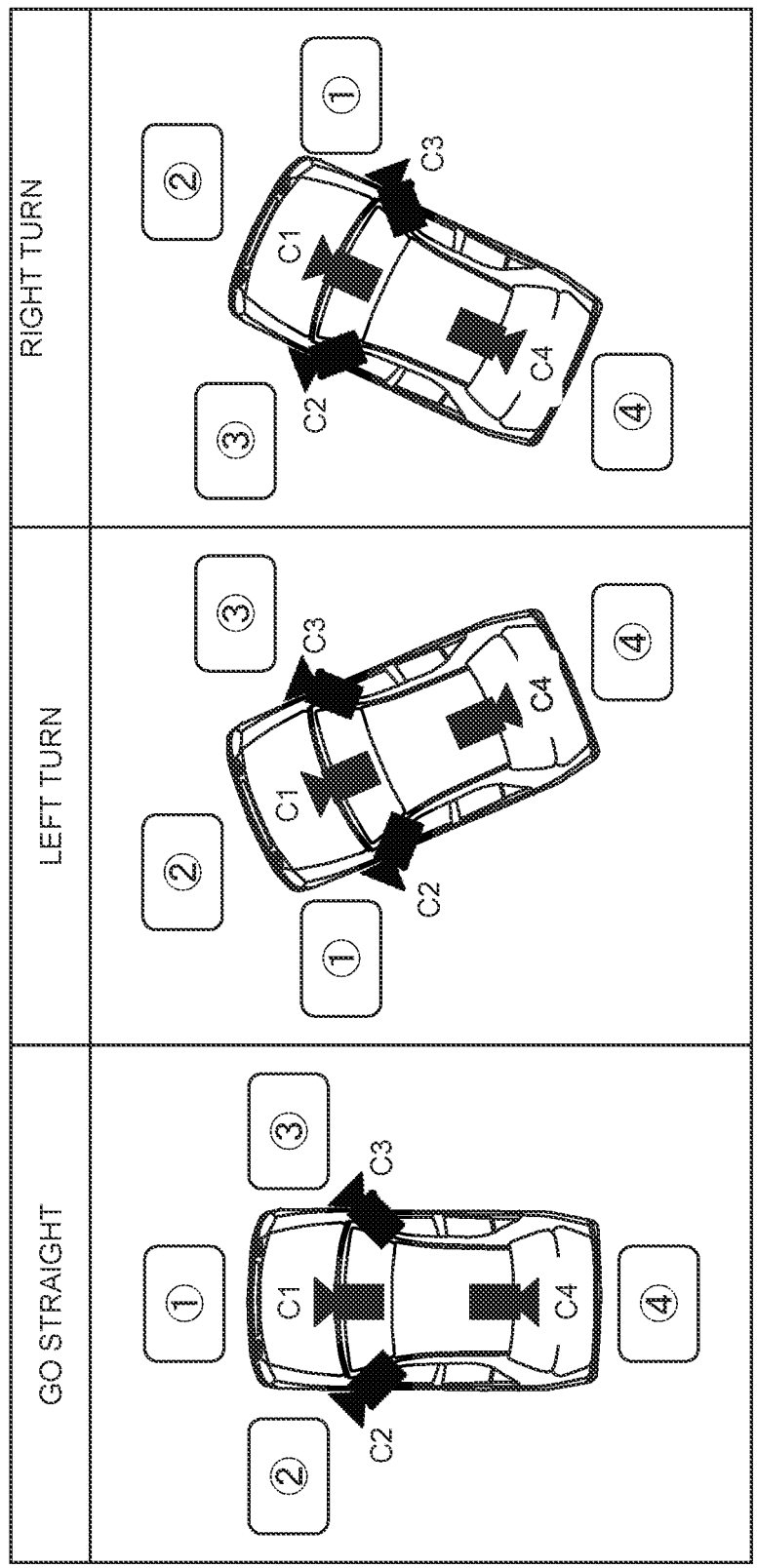
FIG. 13 is a conceptual diagram for explaining an example of data priority of multiple types of data according to an embodiment of the present disclosure.

FIG. 13 is a conceptual diagram for explaining an example of the data priority of the multiple types of data. In the example shown in FIG. 13, the vehicle 100 includes a front camera C1, a left front camera C2, a right front camera C3, and a rear camera C4. The front camera C1 captures a front image IMG1. The left front camera C2 captures a left front image IMG2. The right front camera C3 captures a right front image IMG3. The rear camera C4 captures a rear image IMG4.

Multiple types of images IMG1 to IMG4 are transmitted from the vehicle 100 to the remote operator terminal 200R. The data priority of the images IMG1 to IMG4 depends on a scheduled moving direction of the vehicle 100. More specifically, the data priority of an image closer to the scheduled moving direction is set to be higher than the data priority of another image farther from the scheduled moving direction. The circled numbers in FIG. 13 represent the data priority.

In a case where the vehicle 100 goes straight, the scheduled moving direction of the vehicle 100 is a forward direction. In this case, the front image IMG1 has the highest priority, and the rear image IMG4 has the lowest data priority. The priority of the left front image IMG2 and the right front image IMG3 each is lower than that of the front image IMG1 and higher than that of the rear image IMG4.

In a case where the vehicle 100 makes a left turn, the scheduled moving direction of the vehicle 100 is a left direction. In this case, the priority of the left front image IMG2 is higher than the priority of the right front image IMG3. The priority of the front image IMG1 is lower than that of the left front image IMG2 and higher than that of the right front image IMG3. The rear image IMG4 has the lowest priority.

In a case where the vehicle 100 makes a right turn, the scheduled moving direction of the vehicle 100 is a right direction. In this case, the priority of the right front image IMG3 is higher than the priority of the left front image IMG2. The priority of the front image IMG1 is lower than that of the right front image IMG3 and higher than that of the left front image IMG2. The rear image IMG4 has the lowest priority.

The scheduled moving direction of the vehicle 100 can be recognized based on, for example, at least one of a steering wheel steering direction, a steering wheel steering angle, blinker information, and a gear position. As another example, the scheduled moving direction of the vehicle 100 may be recognized based on the current position and the target route of the vehicle 100.

4-5. Communication Processing (Step S50)

A result of the communication carrier determination processing is notified to the vehicle 100. In Step S50, the vehicle 100 communicates with the external device 200 by using the determined communication carrier.

What is claimed is:

1. A communication control method of controlling a communication between a moving body capable of using multiple communication carriers and an external device, the communication control method comprising:
    acquiring actual communication quality information that is acquired in real time from a communication device group present in a first area located in a direction of movement of the moving body and indicates an actual measured value of a communication quality of each of the multiple communication carriers in the first area;
    priority determination processing that determines priority of the multiple communication carriers in the first area based on the actual communication quality information regarding the first area;
    determining, based on the priority, at least one communication carrier to be used for the communication between the moving body and the external device in the first area; and
    when the actual measured value of the communication quality of a part of the multiple communication carriers in the first area is not available, acquiring predicted communication quality information that indicates a predicted value of the communication quality of the part of the multiple communication carriers in the first area, wherein
    the priority determination processing determines the priority based on the actual measured value of the communication quality indicated by the actual communication quality information and the predicted value of the communication quality indicated by the predicted communication quality information,
    the moving body performs a communication by using a specific communication carrier in a second area located in front of the first area, and
    the acquiring the predicted communication quality information includes acquiring the predicted value of the communication quality of the specific communication carrier in the first area based on an actual measured value of the communication quality of the specific communication carrier in the second area acquired by the moving body.

2. A communication control method of controlling a communication between a moving body capable of using multiple communication carriers and an external device, the communication control method comprising:
    acquiring actual communication quality information that is acquired in real time from a communication device group present in a first area located in a direction of movement of the moving body and indicates an actual measured value of a communication quality of each of the multiple communication carriers in the first area;
    priority determination processing that determines priority of the multiple communication carriers in the first area based on the actual communication quality information regarding the first area; and
    determining, based on the priority, at least one communication carrier to be used for the communication between the moving body and the external device in the first area, wherein
    the multiple communication carriers include a first communication carrier and a second communication carrier,
    the priority determination processing includes:
        calculating a first average communication quality that is an average value of communication qualities of the first communication carrier at a plurality of first positions in the first area;
        calculating a second average communication quality that is an average value of communication qualities of the second communication carrier at a plurality of second positions in the first area; and
        determining the priority of the first communication carrier and the second communication carrier based on a comparison between the first average communication quality and the second average communication quality, and
    the priority determination processing further includes:
        calculating a first variation parameter reflecting a variation in the communication qualities of the first communication carrier at the plurality of first positions;
        calculating a second variation parameter reflecting a variation in the communication qualities of the second communication carrier at the plurality of second positions;
        when the first average communication quality is higher than the second average communication quality by a predetermined threshold or more, setting the priority of the first communication carrier to be higher than the priority of the second communication carrier; and
        when a difference between the first average communication quality and the second average communication quality is less than the predetermined threshold, setting the priority of one of the first communication carrier and the second communication carrier having a smaller variation to be higher based on a comparison between the first variation parameter and the second variation parameter.

3. The communication control method according to claim 1, wherein
    the moving body is a target of a remote operation performed by a remote operator.

4. A communication system that performs a communication between a moving body capable of using multiple communication carriers and an external device, the communication system comprising one or more processors configured to execute:
    acquiring actual communication quality information that is acquired in real time from a communication device group present in a first area located in a direction of movement of the moving body and indicates an actual measured value of a communication quality of each of the multiple communication carriers in the first area;
    priority determination processing that determines priority of the multiple communication carriers in the first area based on the actual communication quality information regarding the first area;

determining, based on the priority, at least one communication carrier to be used for the communication between the moving body and the external device in the first area; and when the actual measured value of the communication quality of a part of the multiple communication carriers in the first area is not available, acquiring predicted communication quality information that indicates a predicted value of the communication quality of the part of the multiple communication carriers in the first area, wherein the priority determination processing determines the priority based on the actual measured value of the communication quality indicated by the actual communication quality information and the predicted value of the communication quality indicated by the predicted communication quality information, the moving body performs a communication by using a specific communication carrier in a second area located in front of the first area, and the acquiring the predicted communication quality information includes acquiring the predicted value of the communication quality of the specific communication carrier in the first area based on an actual measured value of the communication quality of the specific communication carrier in the second area acquired by the moving body.

\* \* \* \* \*